(12) United States Patent
Ho et al.

(10) Patent No.: US 8,483,102 B1
(45) Date of Patent: Jul. 9, 2013

(54) SYSTEM AND METHOD FOR MAPPING A VOICE IDENTITY ACROSS MULTIPLE TELEPHONY NETWORKS WITH TIME ATTRIBUTES

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1249 days.

(21) Appl. No.: 11/926,390

(22) Filed: Oct. 29, 2007

Related U.S. Application Data

(63) Continuation-in-part of application No. 10/980,046, filed on Nov. 2, 2004, now Pat. No. 7,391,858.

(51) Int. Cl.
*H04L 12/16* (2006.01)

(52) U.S. Cl.
USPC ........... 370/271; 370/357; 370/389; 370/401; 370/466; 379/207.03; 379/211.02; 455/414.2; 455/414.4; 455/415

(58) Field of Classification Search
USPC ..... 370/252, 271, 465, 466, 467; 379/211.02, 379/211.03, 211.04, 207.03; 455/414.2, 414.4, 455/415
See application file for complete search history.

(56) References Cited

U.S. PATENT DOCUMENTS

| | | | | |
|---|---|---|---|---|
| 5,737,403 A * | 4/1998 | Zave | ................. | 379/211.02 |
| 6,539,090 B1 * | 3/2003 | Frey et al. | ................. | 379/230 |
| 6,898,274 B1 * | 5/2005 | Galt et al. | ................. | 379/211.02 |
| 7,171,190 B2 * | 1/2007 | Ye et al. | ................. | 455/412.1 |
| 2004/0091095 A1 * | 5/2004 | Weaver | ................. | 379/211.02 |

* cited by examiner

*Primary Examiner* — Alvin Zhu
(74) *Attorney, Agent, or Firm* — North Shore Patents, P.C.; Michele Liu Baillie

(57) ABSTRACT

A method and system includes: one or more phone systems; a policy processor coupled to the phone systems; and a voice identity mapping policy stored in a data storage, the data storage being accessible to the policy processor. The voice identity mapping policy includes: a plurality of search voice identities mapped to one or more target voice identities, where the plurality of the search voice identities are applicable to a plurality of users, where each of the search voice identities and the target voice identities comprises a username for one of the plurality of users, and time attributes indicating when the voice identity mapping policies are valid. When a voice identity for a recipient of a call is received, the policy processor checks for the voice identity mapping policy associated with the voice identity. The call is then forwarded to the target voice identity in the voice identity mapping policy.

20 Claims, 6 Drawing Sheets

Voice Identity Mapping Policy Input Processing

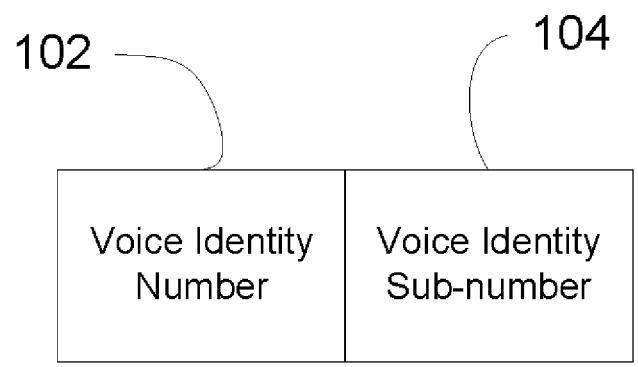
Figure 1. Voice Identity

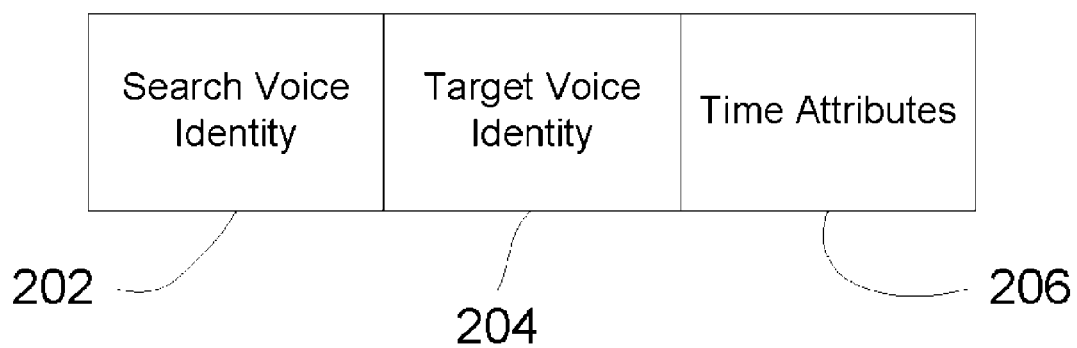
Figure 2. Voice Identity Mapping

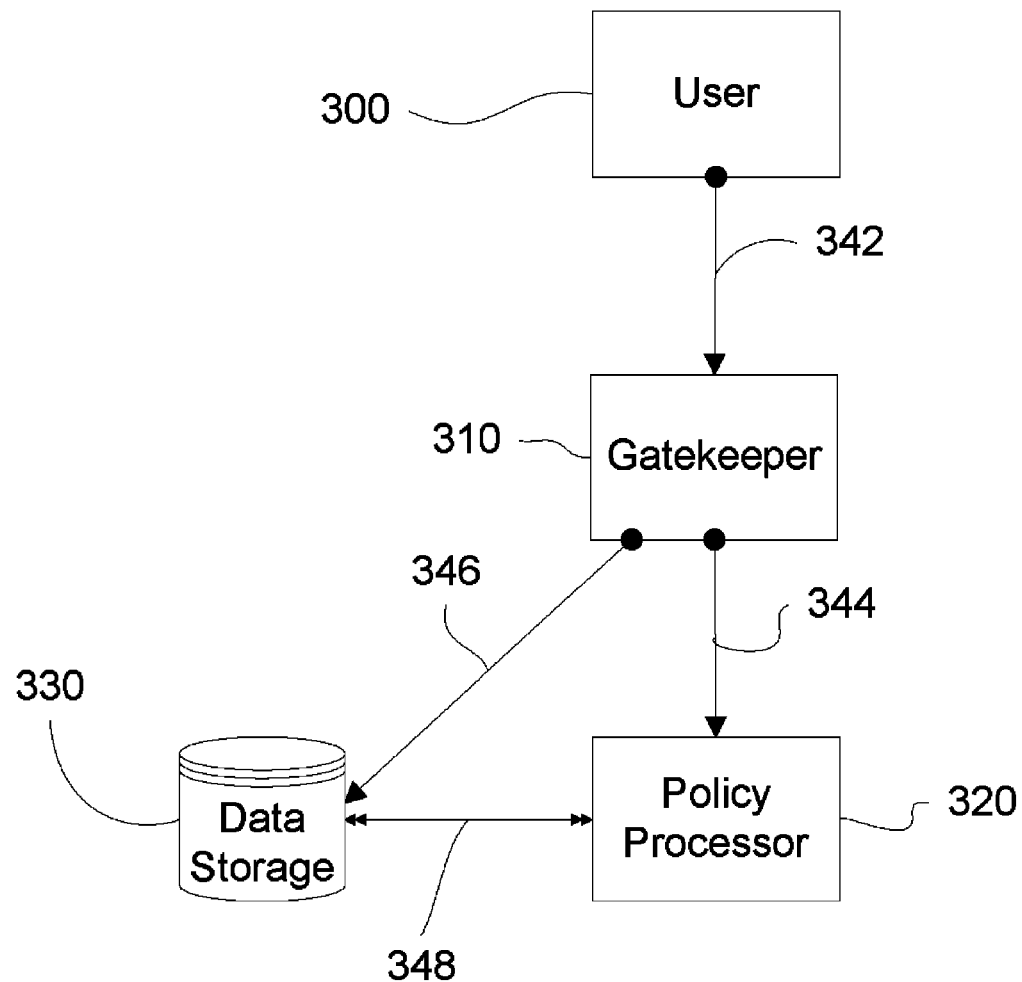
Figure 3. Voice Identity Mapping Policy Input Processing

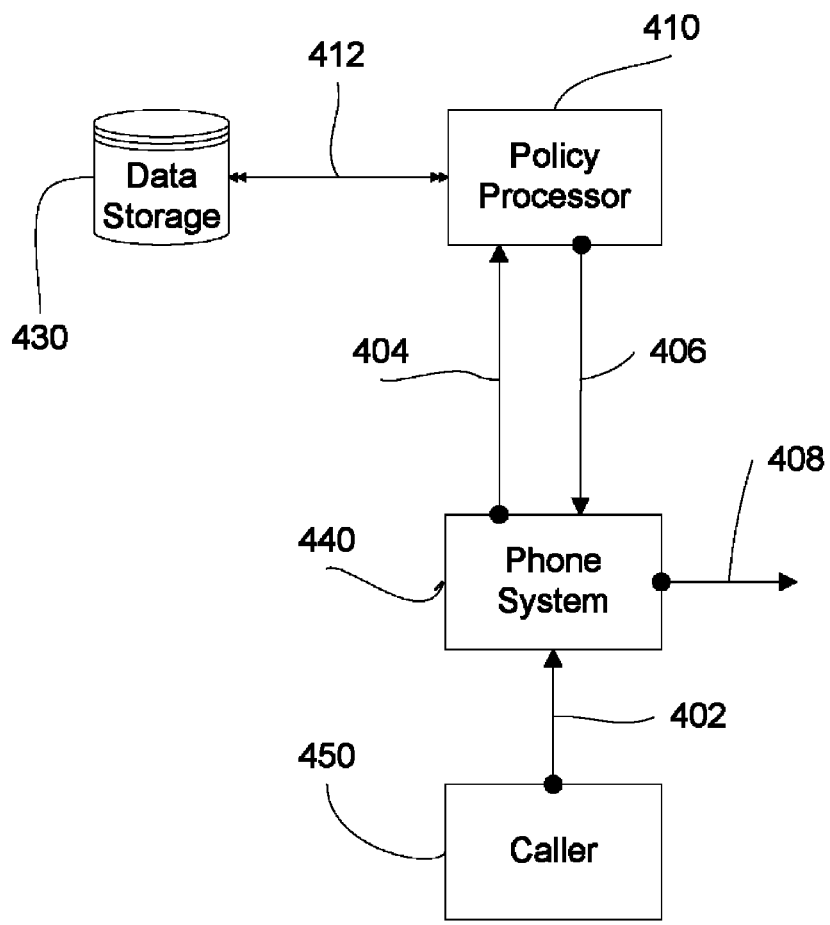
Figure 4a. Centralized Voice Identity Mapping
Policy Call Processing

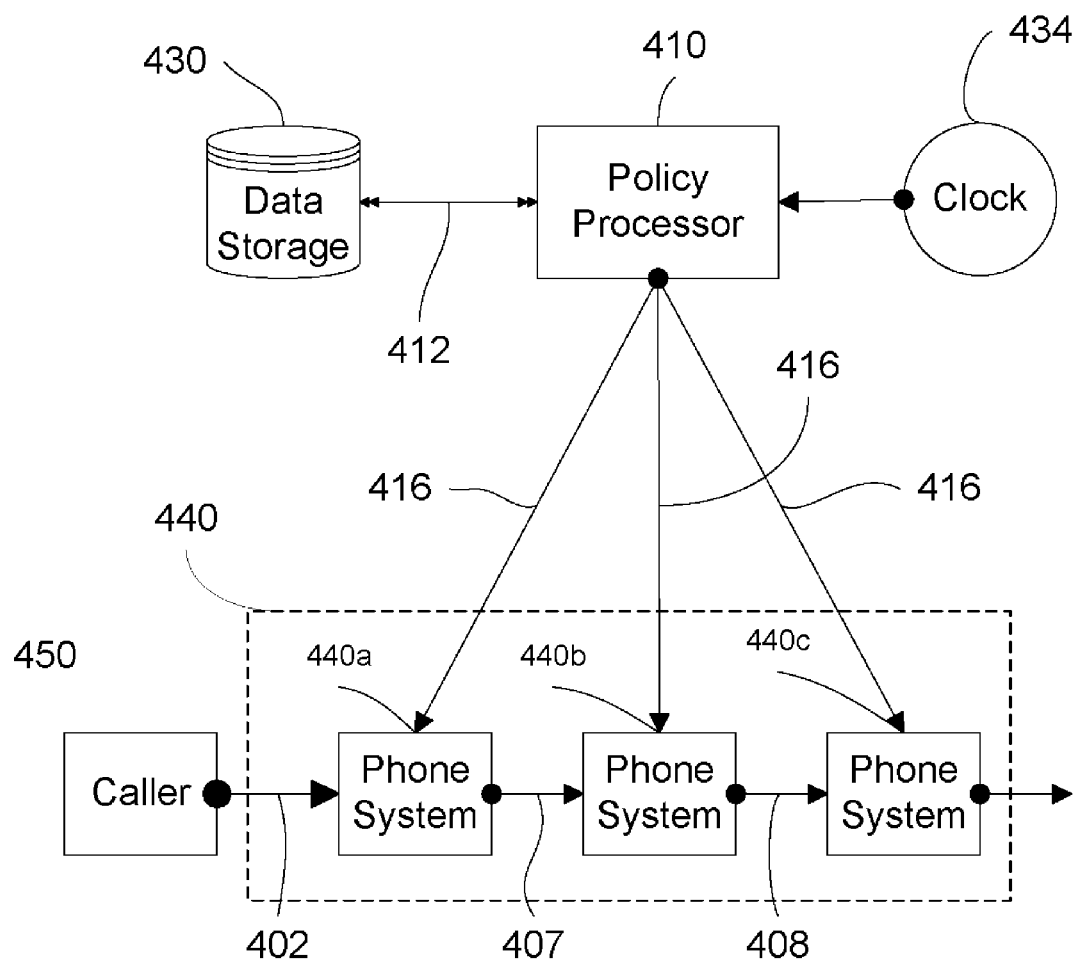
Figure 4b. Distributed Voice Identity Mapping
Policy Call Processing

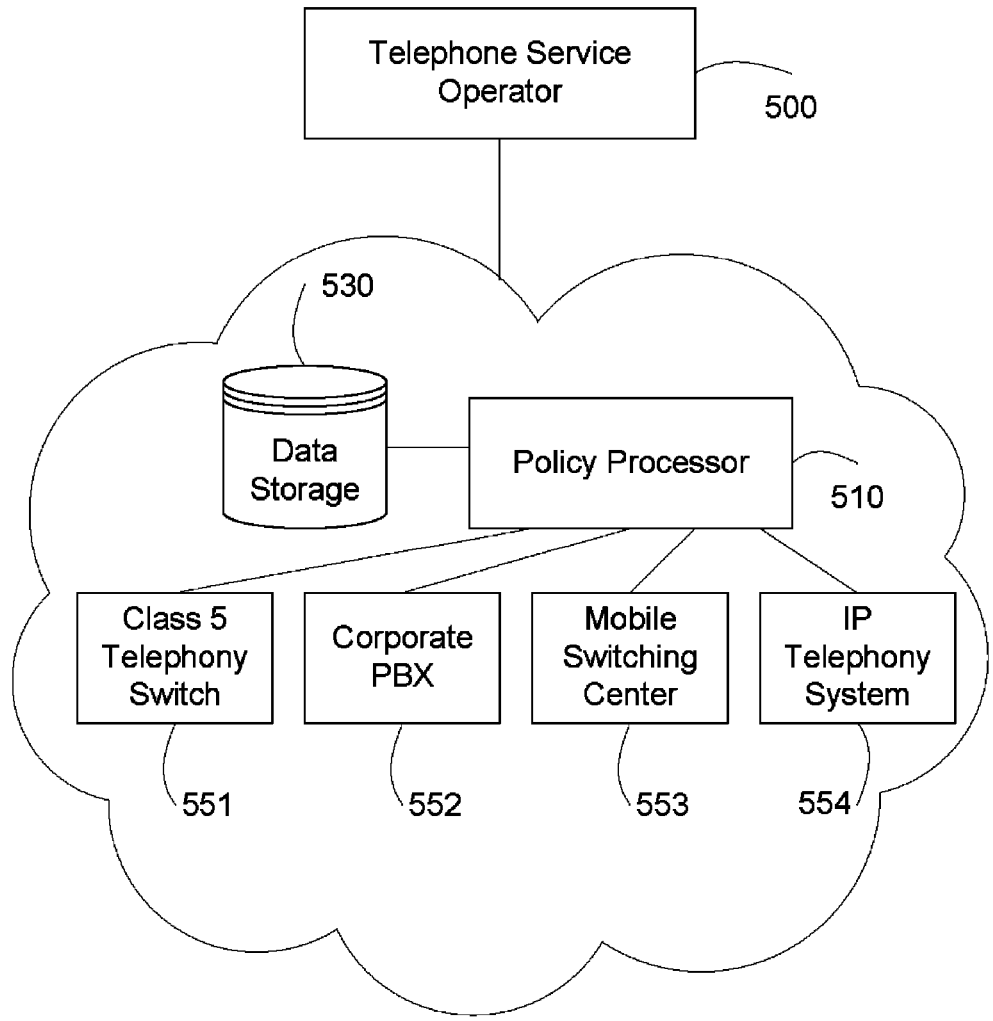
Figure 5. An Operator Providing Voice Identity Mapping Services

SYSTEM AND METHOD FOR MAPPING A VOICE IDENTITY ACROSS MULTIPLE TELEPHONY NETWORKS WITH TIME ATTRIBUTES

CROSS-REFERENCE TO RELATED APPLICATIONS

This application is a continuation-in-part of co-pending U.S. patent application Ser. No. 10/980,046, entitled "System and Method for Mapping a Voice Identity Across Multiple Telephony Networks with Time Attributes", filed on Nov. 2, 2004.

BACKGROUND

1. Field

This invention relates generally to telecommunications, and more specifically, to how calls are routed based on mapping multiple voice identities.

2. Related Arts

The widespread adoption of numerous telephony and data communication technologies such as cellular phones, voice over IP, virtual private networks, broadband access, digital subscriber lines, cable modems and other access methods have changed the way people use phones and the way people communicate. Increasingly, people are associated with multiple telephone numbers that require callers who are trying to reach them to try multiple telephone numbers.

Typically, a corporate telephone system user will have a corporate extension telephone number, a personal or corporate mobile telephone and possibly a remote home or branch office telephone number. To finally reach a user, a caller may need to dial two or more telephone numbers before they finally reach the user to whom they wish to speak. In addition to the time it takes the caller to dial multiple telephone numbers, it takes even more time for the user to then retrieve multiple messages when a caller leaves repetitive voice messages on multiple voice message systems. In this scenario, time is not the only asset at stake. Information can also be lost or confused by redundant voice messages on multiple systems making for inefficient communication that can cost time, money and opportunities.

In one scenario of a work place, a user typically has an office phone on his desk, and carries a personal cellular phone. When the user is in his office, he can be reached on his office phone and his cellular phone. When he is in a meeting or in a break room, he can only be reached directly on his cellular phone. When a caller tries to reach a user on his office phone and cannot reach him, the caller has to try to call the user's cellular phone. When the user cannot be reached on either phones, the caller may decide to leave him a voice mail on either one or more of the user's voice answering systems.

In another scenario, the user visits a branch office in a different city. He carries along his cellular phone. In the branch office, he has an office phone with a phone number different from that of his original office phone. The user would need to inform callers of the new phone number if he wants to be reached on the branch office phone. In this scenario, callers may have to try three phone numbers: the original office phone number, a temporary office phone number, and a cellular phone number before they actually reach the user.

In another scenario, the user travels abroad to another country. He decides not to bring his cellular phone because he does not have international roaming services. Instead, he rents a local cellular phone. He would then need to inform potential callers of the new temporary phone number. Callers not informed of the new temporary phone number would have to try his office phone, cellular phone and then perhaps leave him a voice mail, possibly never knowing whether or not the user receives the voice message. The user would then have to check his voice messages very frequently in order to respond to the calls promptly. In this scenario, the user severely limits his accessibility.

In yet another scenario, a user occasionally works from home according to some schedule. While working at home, the user's home phone is his primary means for communication. For callers who are aware that the user works from home on any particular day, they would call his home phone. Other callers who do not know the user's work schedule would have to leave voice mail on his office phone. In order to ensure that he is responding to telephone calls promptly, the user would need to check his office based voice messages continuously throughout the day. Despite the fact that a user has access to one or more telephones, it is not always easy for callers to reach them easily.

Thus there is a need for a system that transparently allows a caller to efficiently reach a user or his primary voice message system.

SUMMARY

This invention resides in a system and method to map a voice identity to a telephone number. The voice identity including a username. A user has a plurality of phones and each phone has a phone number. The user informs potential callers of the user's voice identity, which includes the user's username. The user has immediate access to one or more of the phones. When a caller places a call using the user's voice identity, the phone call is routed to one of his immediately accessible phones or a designated voice application such as voice mail, based on a voice identity mapping policy.

BRIEF DESCRIPTION OF DRAWINGS

FIG. 1 is block diagram of voice identity number with a voice identity sub-number.

FIG. 2 is block diagram of a voice identity mapping.

FIG. 3 is a flow chart of voice identity mapping policy input processing.

FIG. 4a is a flow chart of centralized voice identity mapping policy call processing.

FIG. 4b is a flow chart of distributed voice identity mapping policy call processing.

FIG. 5 illustrates an operator offering voice identity mapping services.

DETAILED DESCRIPTION

Voice Identity

A voice identity is a designation assigned to a specific user that callers can use to reach that user. Typically, a voice identity is a telephone number or an extension number. FIG. 1 illustrates a voice identity with voice identity sub number. Here, 102 is the primary voice identity number and 104 is an optional voice identity sub-number. If multiple users share the same voice identity number, voice identity sub-number 104 further distinguishes an individual user. In one embodiment of the present invention the voice identity number 102 corresponds to a main corporate telephone number and voice identity sub-number 104 corresponds to an internal extension number.

In one embodiment, the user has a residential phone. The residential phone number is the user's voice identity number, without a voice identity sub-number.

In one embodiment, the user works for a company. The user has an office desk phone, which is assigned an extension number. Within the corporate system, the office desk phone extension is the user's voice identity number without a voice identity sub-number. Optionally, in the same embodiment, the user is also assigned an external phone number that is used outside the company. The external phone number is yet another voice identity.

In one embodiment, a company has a main business phone number and the user is assigned an extension number. To reach the user, an external caller would first dial the company's business phone number, and then the extension. In this embodiment, the voice identity comprises two parts, the business phone number is the voice identity number and the extension is the voice identity sub-number.

In one embodiment, the user is assigned an internal extension that is tied to a voice mail box but is not tied to any office phone. In such an embodiment the internal extension is the user's voice identity.

In one embodiment, a mobile phone number is a voice identity without a sub-number.

In one embodiment, the user subscribes to voice over IP services, receives a username with which callers within the voice over IP service can use to reach him. In such an embodiment, the username can be a voice identity without sub-number. In one embodiment, a voice over IP service is based on instant messaging (IM) technologies, such as Yahoo Messenger™, Microsoft Messenger™, AOL™ IM, Skype™ or other IM-based voice services. In one embodiment, the username can be an IM identity, or an email account identity. In one embodiment, the voice over IP services include a corporate phone service, and the username can be an employee's computer user identity.

In one embodiment, a user receives a username and, additionally, a phone number with which callers outside the voice over IP service can reach him. Both the username and the phone number can be voice identities. Optionally, the voice over IP service provider has a main phone number, and each user is assigned an internal number. A caller outside the service first calls the voice over IP service provider's main phone number, and then enters the internal number to reach the user. The voice over IP service provider main phone number is the voice identity number, and the internal number is the voice identity sub-number.

In one embodiment, a caller intends to leave a user a voice mail message. In this embodiment, the voice mail number is the user's voice identity. Typically, a voice mail number is a phone number. If more than one user uses the same phone number as a voice identity number, that voice mail number can further include a sub-number to identify a specific user. The sub-number is the voice identity sub-number for the user.

Voice Identity Examples:
1. +1 (415) 555-1234
2. x9876
3. +1 (510) 555-6789 ext4567

In the above examples; example 1 has voice identity number +1 (415) 555-1234 and no voice identity sub-number, example 2 has voice identity number extension 9876 and no voice identity sub-number, example 3 has voice identity number +1 (510) 555-6789 and voice identity sub-number 4567.

A voice identity can be a phone number with which a user receives the phone call. Typically the voice identity is associated with a phone at which the user receives the call. In one embodiment, the user does not intend to receive phone calls, but rather to receive voice mail instead. In such an embodiment, there is no phone associated with a phone number voice identity. Instead, the voice identity is merely an access number to call the user's voice mail system.

Voice Identity Mapping

A voice identity mapping allows a user to associate a voice identity to another voice identity. FIG. 2 illustrates a voice identity mapping. Here, 202 is the search voice identity that callers actually call to reach a specific user and 204 is the target voice identity at which the user will receive the call. Typically, when a caller calls the search voice identity, the call is forwarded to the target voice identity. In common phone usage, the search voice identity is the same as the target voice identity, such that no call forwarding is necessary.

Optionally, a voice identity mapping further comprises a time attribute 206. The time attribute indicates when a voice identity mapping is valid.

Voice identity mappings examples:
1. Search voice identity: ext. 4567
    Target voice identity: 1-415-555-9876,
      is valid:
      Monday through Friday: 12 am-8 am and,
      Monday through Friday: 6 pm-12 am
2. Search voice identity: 1-650-555-4321,
    Target voice identity: 1-510-555-4165,
      is valid:
      Saturday through Sunday.
3. Search voice identity: 1-650-555-4322,
    Target voice identity: 1-510-555-4167,
      is valid:
      Sep. 21, 1995 to Mar. 3, 1996.

Example 1 illustrates the search voice identity is extension 4567, without sub-number, with the target voice identity 1-415-555-9876, without a sub-number, and a time attribute that reads the mapping is valid between 12 midnight to 8 am Monday through Friday and between 6 pm in the evening to 12 midnight Monday through Friday.

Example 2 illustrates a search voice identity 1-650-555-4321 and target voice identity 1-510-555-4165 with a time attribute indicating the mapping is valid between 12 midnight Saturday to 12 midnight Monday.

Example 3 illustrates a search voice identity 1-650-555-4322 and target voice identity 1-510-555-4167 with a time attribute reading the mapping is active between the dates Sep. 21, 1995 and Mar. 3, 1996 inclusively.

Voice Identity Mapping Policy

A voice identity mapping policy is a group of one or more voice identity mappings. In one embodiment, a voice identity mapping policy applies specifically to one user.

In one embodiment, a voice identity mapping policy applies to a group of users. In this embodiment, some voice identity mappings may be specific to individual users while other voice identity mappings may apply to a plurality of users.

Voice Identity Mapping Policy Example
Voice Identity Mapping Policy 1:
1. Search voice identity: extension 4567,
    target voice identity: 1-415-555-2300,
      is valid:
      Monday through Friday: 12 am-8 am,
      Monday to Friday: 6 pm-12 am and,
      Saturday through Sunday.
2. Search voice identity: 1-800-555-5600/4567,
    target voice identity: 1-415-555-2300,
      is valid:
      Monday through Friday: 12 am-8 am,
      Monday through Friday: 6 pm-12 am, and,
      Saturday through Sunday.

3. Search voice identity: 1-415-555-1234,
   target voice identity: 1-415-555-2300,
   is valid:
   Monday through Friday: 12 am-8 am, and,
   Monday through Friday: 6 pm-12 am.
4. Search voice identity: 1-415-555-2598,
   target voice identity: 1-415-555-2300.
   is valid: Always.
5. Search voice identity: 1-415-555-2300,
   target voice identity: 1-416-555-4165,
   is valid:
   Aug. 7, 2002 through Aug. 14, 2002.

In above Voice Identity Mapping Policy 1, the voice identity mapping policy has six voice identity mappings. The user is an employee in a company. The company has a main business phone number 1-800-555-5600. The user has an office desk phone with an extension 4567. The user also has a personal cellular phone 1-415-555-1234. At home, the user has two phone lines. The main home phone line has number 1-415-555-2300. The second home phone line, which he uses for Internet dial up access, has number 1-415-555-2598. The user's parents live in Canada and have a home phone 1-416-555-4165.

Voice identity mappings 1 and 2 of Voice Identity Mapping Policy 1 above indicates the user desires to forward his business phone to his main home phone during non-working hours, weekdays between 6 pm and 8 am and weekends. Voice identity mapping 3 states calls placed to the user's cellular phone number are forwarded to his main home phone. Voice identity mapping 4 shows the user's second home phone line is always forwarded to the main home phone line. Voice identity mapping 5 shows the user has a vacation trip to visit his parents in Canada during summer of 2002, from August 7 to 14.

When a call is made, the voice identity mappings in a policy are applied to the call. The mappings are applied until no more mapping is found applicable. If no mapping is found applicable in the process, the voice identity mapping policy is not applicable to the call. Otherwise, the final resulting target voice identity is used for the completion of the call according to the voice identity mapping policy. The attributes of all applicable mappings are enforced.

In a voice identity mapping policy, the target voice identity of a voice identity mapping may be a search voice identity of another voice identity mapping. The target voice identity of the latter mapping can be the search voice identity of yet another voice identity mapping. It is perfectly legitimate that among a group of voice identity mappings, target voice identities and search voice identities can form a transitive chain, where a target voice identity of a voice identity mapping is the search voice identity of the next voice identity mapping.

In one embodiment, a voice identity mapping policy may not yield a resulting target voice identity when applied to a call. When this happens, the call cannot be completed according to the voice identity mapping policy.

In one embodiment, when a call cannot be completed according to a particular voice identity mapping policy, a policy processor uses the original search voice identity as the resulting target voice identity.

In another embodiment, when a call cannot be completed according to a particular voice identity mapping policy a policy processor rejects the call.

In one embodiment, when a call cannot be completed according to a particular voice identity mapping policy, a policy processor selects another voice identity mapping policy matching the original search voice identity. If there is no further matching voice identity mapping policy, the policy processor may reject the call or uses the original search voice identity as the resulting target voice identity.

In the example Voice Identity Mapping Policy 1 above, the target voice identity of voice identity mapping 1 is a search voice identity of the voice identity mapping 5. The target voice identity of the voice identity mapping 5 is not a search voice identity of any voice identity mapping. During the time between 6 pm to midnight on Fridays, any call to corporate extension 4567 is forwarded to 1-415-555-2300. One or more phones associated with the resulting target voice identity will ring and the user answers the call. If the process cannot be completed due to transitive mapping, the call cannot be completed.

In one embodiment, if a call cannot be completed due to transitive mapping, the call is forwarded to the first target voice identity.

In one embodiment, the call is forwarded to a default phone number.

Voice Identity Mapping Policy Processing

FIG. 3 illustrates the processing of voice identity mapping policy input by a user. This process allows the user to customize his voice identity mapping policy. User 300 submits authentication data 342 to a gatekeeper 310 to gain access to create, modify or query his voice identity mapping policy. Gatekeeper 310 retrieves stored authentication data 346 from data storage 330 and compares the stored data with the authentication data 342 submitted by user 300. If the authentication data 342 submitted by user 300 matches authentication data 346 as stored in data storage 330, gatekeeper 310 grants the user access to create, modify or query his voice identity mapping policy. If the authentication data submitted by user 300 does not match authentication data as stored in data storage 330, user 300 is denied access.

Upon successful authentication, the gatekeeper passes the user's access information 344 to a policy processor 320. If the information 344 indicates creation of a new voice identity mapping policy, the policy processor 320 verifies the correctness, by prompting the user to confirm, and stores the new voice identity mapping policy 348 into data storage 330. If the information 344 indicates modification of an existing voice identity mapping policy, the policy processor 320 verifies the correctness, by prompting the user to confirm, and stores the modified voice identity mapping policy 348 into data storage 330.

In one embodiment, gatekeeper 310 is software application executed on an integrated application server in a telephony system.

In one embodiment, gatekeeper 310 is software application executed on a stand-alone computer system coupled to a telephony system.

In one embodiment, gatekeeper 310 is application specific integrated circuit coupled to a telephony system.

In one embodiment, policy processor 320 is software application executed on an integrated application server in a telephony system.

In one embodiment, policy processor 320 is software application executed on a stand-alone computer system coupled to a telephony system.

In one embodiment, policy processor 320 is application specific integrated circuit coupled to a telephony system.

FIGS. 4*a* and 4*b* illustrate how a voice identity mapping policy is applied to an incoming call. In FIG. 4*a*, a caller makes a phone call from a phone 450. The calling number 402 is fed to a phone system 440. The phone system 440 performs call processing to determine how to route the call.

In one embodiment, the phone system 440 is a Class 5 telephony switch.

In one embodiment, the phone system 440 is a corporate PBX.

In one embodiment, the phone system 440 is an IP telephony system comprising of a soft-switch. Optionally, the IP telephony system further comprises a media gateway.

Upon receiving the calling number 402, the phone system 440 queries the voice identity mapping policy processor 410. The input called number 404 is fed to the policy processor 410. The policy processor 410 treats the input called number 404 as a search voice identity. It matches the search voice identity 404 against the search voice identities of voice identity mapping policies in the database 430 through coupling 412. If there is no match, the policy processor 410 informs the phone system 440 through 406 that no policy applies and the phone system 440 should proceed with the normal call processing.

In one embodiment, policy processor 410 is software application executed on an integrated application server in phone system 440.

In one embodiment, policy processor 410 is software application executed on a stand-alone computer system coupled to phone system 440.

In one embodiment, policy processor 410 is application specific integrated circuit coupled to phone system 440.

If there is a match, the policy processor 410 selects one matching voice identity mapping policy from the database 430. In one embodiment, the policy processor 410 selects the first matching voice identity mapping policy.

In one embodiment, the policy processor 410 selects the most frequently applied matching voice identity mapping policy amongst all matching voice identity mapping policies.

In one embodiment, the policy processor 410 selects the most recently applied matching voice identity mapping policy.

The policy processor 410 determines, from the policy, the first voice identity mapping whose search voice identity matches the input voice identity. It further validates the attributes of the voice identity mapping. If the attribute contains a time attribute, the policy processor 410 validates with the current time. If the time is not valid, the policy processor 410 determines the next voice identity mapping in the voice identity mapping policy. If the policy processor 410 exhausts all voice identity mappings in the selected voice identity mapping policy without finding a valid voice identity mapping, it selects another matching voice identity policy from the database 430 until no more voice identity policies can be found, or a voice identity mapping is validated.

In one embodiment, when no voice identity policy can be found, the policy processor 410 informs the phone system 440 through 406 to direct the call to the phone number indicated by the input voice identity.

In one embodiment, when policy processor 410 validates a voice identity mapping, it determines the target voice identity from the voice identity mapping. Policy processor 410 uses the target voice identity as the input voice identity, and repeats the process above to determine a voice identity mapping policy and a voice identity mapping.

The policy processor 410 processes accordingly and identifies a chain of zero or more voice identity mappings that are applicable to the original input voice identity, with a current input voice identity. The policy processor 410 informs the phone system 440 through the result 406 that the call should be forwarded to the current input voice identity. The phone system 440 further processes the call to the resulting phone number.

In one embodiment, a voice identity mapping policy contains transitive mappings, such that a target voice identity of a voice identity mapping is the search voice identity of another voice identity mapping. Optionally, the time attributes may contain overlapping time periods in which two or more voice identity mappings are valid at the same time. In such an embodiment, a transitive mapping occurs. Policy processor 410 may not be able to terminate the processing due to transitive mappings. The policy processor may decide after a number of mapping selections to stop further processing.

In one embodiment, the policy processor 410 stops after a set number iterations of finding matching voice identity mappings.

In one embodiment, the policy processor 410 checks if a matching voice identity mapping was used previously during the processing of the input voice identity. If a repeat is found, the policy processor 410 determines that the processing may not terminate and stops the processing.

In one embodiment, the policy processor 410 checks for repeating target voice identity and stops upon a repeat. The policy processor concludes there is no matching voice identity mapping within the policy.

In one embodiment, the policy processor determines existence of transitive mappings and stores in the database 430 voice identities that cannot be resolved successfully due to the transitive mappings. Upon receiving the input search voice identity, the policy processor 410 first checks if the input search voice identity matches any identified irresolvable voice identities before searching for a matching voice identity mapping or voice identity mapping policy.

FIG. 4b illustrates an embodiment where call processing is conducted in a distributed manner. In such an embodiment, the policy processor 410 communicates to one or more phone systems 440. Each phone system has call processing capability to forward a phone number to another phone number. Typically phone systems 440 can store a list of forwarding entries.

In one embodiment, human operators upon receipt of work orders configure the forwarding entries manually.

In one embodiment, phone systems 440 have an application programming interface allowing another system to automatically configure the forwarding entries.

In FIG. 4b, after the policy processor 410 receives a voice identity mapping policy as described for FIG. 3, it processes the voice identity mappings in a voice identity mapping policy, to determine, based on the time attributes, the date and time when the voice identity mappings should be activated or de-activated. The policy processor 410 determines the next time instance when one or more of the voice identity mappings are to be activated. It sets up a timer for the time instance. It monitors the time based on the time input from the clock 434. When the timer expires, the policy processor 410 retrieves the voice identity mapping policy associated with the time from the data storage 430. Policy processor 410 selects all voice identity mappings that are to be activated at a particular time, processes the selected voice identity mappings into a list of phone number forwarding mappings. It further splits the list of phone number forwarding mappings into multiple lists, one for each of phone systems 440 based on the phone numbers owned by each phone system. The policy processor 410 generates, for each list of phone number forwarding mappings intended for a phone system, a forwarding configuration 416. It then passes the forwarding configuration 416 to the phone systems 440.

In one embodiment, the forwarding configuration is a work order such that a human operator can configure the phone system 440.

In another embodiment, forwarding configuration 416 is sent to the phone system 440 using the application programming interface for phone systems. In addition to sending the forwarding configuration lists to the phone systems 440, the policy processor 410 sets up a timer for the next voice identity mapping activation change, either to activate a voice identity mapping or to deactivate a voice identity mapping.

In one embodiment, the each of phone systems 440 may have different phone number forwarding capabilities. For example, phone system 440a may not handle transitive forwarding mappings; while phone systems 440b and 440c can. When the policy processor 410 generates the forwarding configuration list for phone system 440a, it retrieves the information about the capability of the phone system 440a from the data storage 430. It then resolves all transitive mappings in the forwarding configuration and generates a forwarding configuration without transitive mapping.

In FIG. 4b, a caller makes a call from a phone 450. The phone number information 402 is sent to the phone system 440a. The phone system 440a checks against the forwarding mapping configuration to see if there is a matching forwarding mapping. If a matching forwarding mapping exists, phone system 440a determines the next phone number to which the call should be forwarded based on the forwarding mappings, and uses the next phone number for call routing. If no matching forwarding mapping exists, the phone system 440a continues the call routing based on the original phone number. Phone system 440a, upon call routing processing, which is known to the skill in the art, may determine that the next phone number belongs to phone system 440b. The phone system 440a would then pass phone number 407, which may be the next phone number, to the phone system 440b. The phone system 440b processes the incoming phone number similarly to that of the phone system 440a, and may determine that the next phone number belongs to phone system 440c. The phone system 440b would then pass the phone number information 408 to the phone system 440c. The phone system 440c processes the incoming phone number 408 similarly to that of phone system 440a. This process continues with zero or more phone systems until a phone system determines there are no forwarding mappings and routes the call according to its internal routing protocols.

FIG. 5 illustrates an operator offering voice identity mapping services.

Telephone service operator 500 offers a plurality of voice services provided by a plurality of phone systems Class 5 telephony switch 551, corporate PBX 552, mobile switching center 553, and IP telephone system 554. In one embodiment the plurality of voice services include residential voice services, corporate voice services, mobile voice services, and voice over IP services. In one embodiment, Class 5 telephony switch 551 provides residential voice services; corporate PBX 552 provides corporate voice services; mobile switching center 553 provides mobile voice services; and IP telephony system 554 provides voice over IP services. Telephone service operator 500 offers voice identity mapping services among the phone systems Class 5 telephony switch 551, corporate PBX 552, mobile switching center 553, and IP telephone system 554. Operator 500 includes policy processor 510 and data storage 530. Data storage 530 includes voice identity mapping policies for the voice identity mapping services. Policy processor 510 connects to data storage 530 and the plurality of phone systems Class 5 telephony switch 551, corporate PBX 552, mobile switching center 553, and IP telephone system 554.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A system to map a voice identity, comprising:
   one or more phone systems for providing one or more voice services, the phone systems comprising one or more telephony switches performing call routing of the voice identity;
   at least one policy processor coupled to the telephony switches for receiving the voice identity from the one or more telephony switches; and
   at least one voice identity mapping policy used in providing the voice services and stored in a data storage, the data storage being accessible to the at least one policy processor, the voice identity mapping policy comprising:
      a plurality of search voice identities mapped to one or more target voice identities, wherein the plurality of the search voice identities are applicable to a plurality of users, and
      time attributes indicating when the voice identity mapping policies are valid,
   wherein in response to receiving the voice identity from the one or more telephony switches, the at least one policy processor matches the voice identity to a given search voice identity, wherein the given search voice identity is mapped by the policy processor to a given target voice identity according to the at least one voice identity mapping policy, wherein voice identity, the given search voice identity, and the given target voice identity each comprises a username,
   wherein the at least one policy processor sends the given target voice identity comprising the username to the one or more telephony switches,
   wherein in response to receiving the given target voice identity comprising the username, the one or more telephony switches routes the call using the username.

2. The system of claim 1, wherein at least one of the phone systems comprises a private branch exchange (PBX), a public switched telephone network (PSTN), a voice over internet protocol (VOIP) network, or a wireless telephone network.

3. The system of claim 2, wherein the at least one policy processor comprises a software application executed in at least one of the phone systems' application server, a stand-alone computer coupled to at least one of the phone systems, or an application specific integrated circuit (ASIC) coupled to at least one of the phone systems.

4. The system of claim 2, wherein the VOIP network provides a VOIP service based on instant message (IM) technologies.

5. The system of claim 4, wherein the username comprises an IM identity or an email account identity.

6. The system of claim 2, wherein the VOIP network provides a corporate phone service, wherein the username comprises an employee's computer user identity.

7. The system of claim 1, comprising a plurality of phone systems and a telephone operator for operating the at least one policy processor and the plurality of phone systems to provide a plurality of voice services used in the voice identity mapping policies, the telephone operator having access to the data storage.

8. The system of claim 7, wherein the plurality of voice services comprises at least one of the following:
- a corporate voice service;
- a residential voice service;
- a VOIP service; or
- a mobile voice service.

9. The system of claim 7, wherein at least two of the plurality of phone systems provide different voice services.

10. The system of claim 1, wherein the voice identity mapping policy further comprises:
- the plurality of search voice identities transitively mapped to the one or more target voice identities, wherein the plurality of search voice identities are applicable to the plurality of users, wherein a voice identity matches a first search voice identity of a first phone system, wherein the first search voice identity is mapped by the at least one policy processor to a first target voice identity of a second phone system according to a first mapping policy, wherein the first target voice identity matches a second search voice identity of a second mapping policy, wherein the second search voice identity is mapped by the at least one policy processor to a second target voice identity of a third phone system according to the second mapping policy, wherein the second target voice identity is different from the first search voice identity,
- wherein the search voice identities, the first target voice identity, and the second target voice identity comprises the username for one of the plurality of users.

11. A method for processing voice identity mappings, comprising:
- receiving a voice identity for a recipient of an initial voice call by at least one policy processor from one or more telephony switches performing call routing of the voice identity;
- checking for at least one voice identity mapping policy associated with the voice identity, the at least one voice identity mapping policy comprising:
  - a plurality of search voice identities mapped to one or more target voice identities, wherein the plurality of the search voice identities are applicable to a plurality of users, and
  - a time attribute indicating when the voice identity mapping policy is valid;
- in response to receiving the voice identity from the one or more telephony switches, matching the voice identity to a given search voice identity;
- mapping the given search voice identity to a given target voice identity according to the at least one voice identity mapping policy, wherein the voice identity, the given search identity, and the given target identity each comprise a username; and
- sending the given target voice identity comprising the username to the one or more telephony switches, wherein the one or more telephone switches routes the initial voice call to the target voice identity using the username.

12. The method of claim 11, wherein the initial call is made from one of a plurality of phone systems, wherein the plurality of phone systems comprise a private branch exchange (PBX), a public switched telephone network (PSTN), a voice over internet protocol (VOIP) network, or a wireless telephone network.

13. The method of claim 12, wherein the checking is performed by the at least one policy processor, wherein the at least one policy processor comprises a software application executed in the phone system's application server, a standalone computer coupled to the phone system, or an application specific integrated circuit (ASIC) coupled to the phone system.

14. The method of claim 12, wherein the VOIP network provides a VOW service based on instant message (IM) technologies.

15. The method of claim 14, wherein the username of the voice identity comprises an IM identity or an email account identity.

16. The method of claim 12, wherein the VOIP network provides a corporate phone service, wherein the username of the voice identity comprises an employee's computer user identity.

17. The method of claim 11, wherein the checking is performed by a telephone operator for operating the at least one policy processor and a plurality of phone systems to provide a plurality of voice services used in the at least one voice identity mapping policy.

18. The method of claim 17, wherein the plurality of voice services comprises at least one of the following:
- a corporate voice service;
- a residential voice service;
- a VOIP service; or
- a mobile voice service.

19. The method of claim 17, wherein at least two of the plurality of phone systems provide different voice services.

20. The method of claim 11, wherein the at least one voice identity mapping policy further comprises:
- the plurality of search voice identities transitively mapped to the one or more target voice identities, wherein the plurality of search voice identities are applicable to the plurality of users, wherein a voice identity matches a first search voice identity of a first phone system, wherein the first search voice identity is mapped by the at least one policy processor to a first target voice identity of a second phone system according to a first mapping policy, wherein the first target voice identity matches a second search voice identity of a second mapping policy, wherein the second search voice identity is mapped by the at least one policy processor to a second target voice identity of a third phone system according to the second mapping policy, wherein the second target voice identity is different from the first search voice identity,
- wherein the search voice identities, the first target voice identity, and the second target voice identity comprises the username for one of the plurality of users.

* * * * *